United States Patent [19]
Moraw et al.

[11] 4,233,380
[45] Nov. 11, 1980

[54] PROCESS FOR SHAPING A THERMOPLASTIC LAYER

[75] Inventors: Roland Moraw; Günther Schädlich, both of Naurod, Fed. Rep. of Germany

[73] Assignee: Hoechst Aktiengesellschaft, Fed. Rep. of Germany

[21] Appl. No.: 902,538

[22] Filed: May 3, 1978

Related U.S. Application Data

[63] Continuation of Ser. No. 588,564, Jun. 19, 1975, abandoned, which is a continuation of Ser. No. 341,335, Mar. 15, 1973, abandoned.

[30] Foreign Application Priority Data

Mar. 17, 1972 [DE] Fed. Rep. of Germany ....... 2212968

[51] Int. Cl.[2] ........................ G03G 16/00; G03H 1/04
[52] U.S. Cl. ........................................ 430/2; 430/50; 346/77 E; 346/151
[58] Field of Search ............. 96/1.1, 1 PS; 346/77 E, 346/151

[56] References Cited

U.S. PATENT DOCUMENTS

| | | | |
|---|---|---|---|
| 3,196,008 | 7/1965 | Mihajlov et al. | 96/1.1 |
| 3,258,336 | 6/1966 | Ewing | 96/1.1 |
| 3,291,601 | 12/1966 | Gaynor | 96/1.1 |
| 3,317,316 | 5/1967 | Bean et al. | 96/1.1 |
| 3,408,181 | 10/1968 | Mammino | 96/1.1 |
| 3,441,947 | 4/1969 | Schmiedel | 346/151 |
| 3,560,205 | 2/1971 | Urbach | 96/1.1 |

OTHER PUBLICATIONS

Lorant, British Journal of Photography, 9/64, vol. III, #5435, pp. 752, 753, 766.
Sullivan et al., Photographic Science and Engineering, vol. 8, #4, 7/64, pp. 206–211.

*Primary Examiner*—Roland E. Martin, Jr.
*Assistant Examiner*—John L. Goodrow
*Attorney, Agent, or Firm*—James E. Bryan

[57] ABSTRACT

This invention relates to a process for shaping a recording produced on a material including a photoconductive, thermoplastic layer disposed on a carrier by electrostatic charging and exposure to light, which process comprises disposing the said material on a rigid base, at least one surface region of which is electrically conductive, and heating it.

6 Claims, 5 Drawing Figures

PROCESS FOR SHAPING A THERMOPLASTIC LAYER

This is a continuation, of application Ser. No. 588,564, filed June 19, 1975, now abandoned in turn, a continuation of Ser. No. 341,335, filed Mar. 15, 1973, now abandoned.

This invention relates to a process for shaping, by means of a heat treatment, a recording which has been produced on a photoconductive, thermoplastic material.

Photoconductive thermoplastic materials for recording purposes comprise, if they are not self-supporting, an optionally transparent carrier, for example of glass or a plastic material, which may be provided with a conducting layer of, for example, tin oxide or aluminum, and, located thereon, a photoconducting, thermoplastic layer comprising a photoconductive substance and, optionally, additives, for example activators and sensitizers, dispersed in a thermoplastic binder. In addition, a covering layer which improves the optical reflection may be applied to the thermoplastic layer. Such materials are also known in which the photoconductive layer and the thermoplastic layer form two independent layers one on top of the other. To manufacture recordings, these materials are charged in the dark, generally electrostatically, and are exposed image-wise. In recording materials with separate photoconductive and thermoplastic layers, the material is re-charged after exposure. It is then warmed under controlled conditions, whereby the charge image is converted into a relief image. If desired, the relief image may be erased by stronger warming. It is known to record or erase, on such recording materials, not only conventional images but also holograms. It is also known to record partial images, for example sub-holograms, on the recording materials described. Thus German Patent Application No. P 20 61 417.9 describes the production or erasure of relief images on recording layers, with the aid of stencils, over only a partial region down to less than one square millimeter. This process is, however, dependent on mechanical process steps involving the movement of large amounts of material, which may require a longer setting time and a mechanically relatively involved control system.

Furthermore, a process is known for recording sub-holograms of the order of magnitude of one square centimeter, in which a rigid carrier of glass is provided with a pattern of a conductive, transparent layer on which the thermoplastic photoconductive layer is applied. In this process, the treatment, for example the charging and warming of certain parts of the material surface can be carried out relatively rapidly and simply, and adverse doming of the recording layer does not occur thereby; but the manufacture of such recording materials, which includes the production of the conductivity pattern and the application of the recording layer, is considerably more involved than a continuous coating of a flexible carrier such as a film or a foil. Furthermore, it is much more difficult to maintain a uniform coating of individual sheets than is the case when coating continuous strips.

The object of the present invention was to provide a process for shaping, by means of a heat treatment, a recording produced on a photoconductive thermoplastic material including a flexible carrier and, optionally, an electrically conductive intermediate layer, in which process the specific advantages of recording layers on film or foil carriers, such as relatively simple coating and simple replaceability, are maintained while additionally benefiting from the specific advantages of recording layers on rigid carriers, such as a good planar position.

By "shaping" of a recording there is to be understood both the production of a relief image by heat treatment and also the partial or total erasure of such an image by an appropriately more intense heat treatment. Hence, both the latent charge image obtained by electrostatic charging and exposure, and the relief image produced, are regarded as a recording.

The process according to the invention possesses diverse applications and couples relatively simple manufacture of the recording material with relatively rapid and substantially exact shaping. In particular, the shaping of partial regions by electrical control becomes possible by the process according to the invention, so avoiding time-consuming settings resulting from mechanical movement of material. For this, all that is required in the process of the invention is to form a conductivity pattern on the electrically conductive base.

The process of the invention may be carried out by transmission or reflection. However, the rigid, at least partially electrically conducting base is preferably transparent. This makes it possible to work by transmission, which is advantageous, in the case of recording material which is transparent, as is usually the case.

The photoconductive thermoplastic material including the flexible carrier, for example a polyester or cellulose acetate carrier, is laminated onto the rigid, at least partially electrically conductive base.

The heat energy required for the shaping may, for example, be generated by electrically heating a conductive layer on a base or may be applied to the recording material externally by infra-red irradiation or by warm air. In the case when the recording material has a conductive intermediate layer of low ohmic resistance it is possible to generate the requisite heat energy via this intermediate layer by electrical heating. In the case of electrical heating, the requisite amount of heat may be metered precisely by the potential applied and by the duration of the treatment. Furthermore, it is easy to make electrical contact with, for example, the electrically conductive covering layer of the base, for example by soldering, which permits reliable and reproducible working. Hence, the heat energy required for the shaping is preferably generated by electrically heating a conductive covering layer on a base. If the conductive surface of the rigid base has a conductivity pattern thereon it is possible to obtain a locally defined charge during electrostatic charging of the recording material, without its own conducting intermediate layer, by applying a potential, of opposite polarity or the same polarity as the charging polarity, to the conductivity region over which a partial relief image is to be produced. Electrical heating to shape a partial relief image then may be effected by applying a potential to the conductivity region, which is opposite the partial image, so that only this region of the recording material is warmed.

The invention is illustrated by way of example only, with reference to the accompanying drawings in which.

Figure 1:
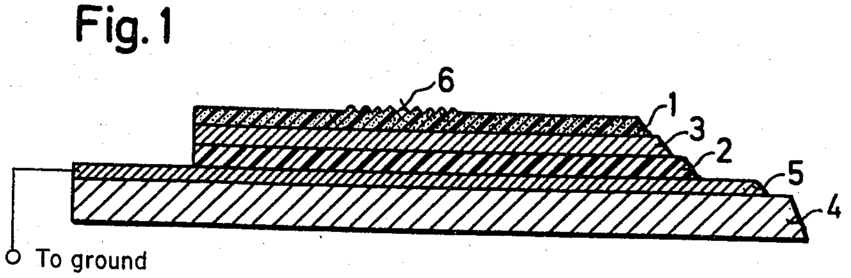
FIG. 1 is a side elevation of a recording material comprising a photoconductive, thermoplastic material having a conductive intermediate layer, the material being disposed on a rigid base provided with a top conductive layer.

In FIGS. 2 to 5, features which are similar or identical to those of FIG. 1 are designated by the reference numerals used for FIG. 1.

Referring to FIG. 1, a recording material comprises a photoconductive, thermoplastic layer 1 disposed on a flexible foil carrier 2 which has a conductive intermediate layer 3. The recording material is disposed on a base comprising a conductive covering layer 5 disposed on the surface of a rigid base 4. To produce the relief image 6, the conductive covering layer 5 is grounded while electrostatically charging the photoconductive thermoplastic layer 1 under a corona. After image-wise exposure of the recording material, a potential is applied for a certain time to two opposite edges of the conductive covering layer 5, whereby a relief-like diffraction image, which behaves as a diffraction grating, is produced on the photoconductive, thermoplastic layer 1.

To erase the relief image 6, a somewhat greater potential than is required for producing the image is applied for a somewhat longer time.

Figure 2:
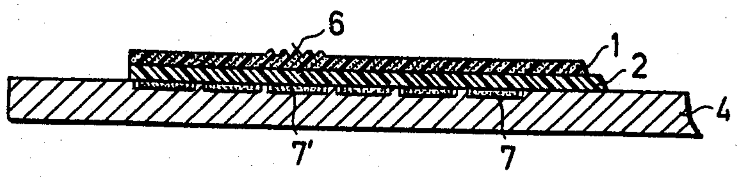
FIG. 2 is a side elevation of a recording material comprising a photoconductive thermoplastic material located, without a conductive intermediate layer, on a rigid base having a conductivity pattern thereon.
Figure 3:
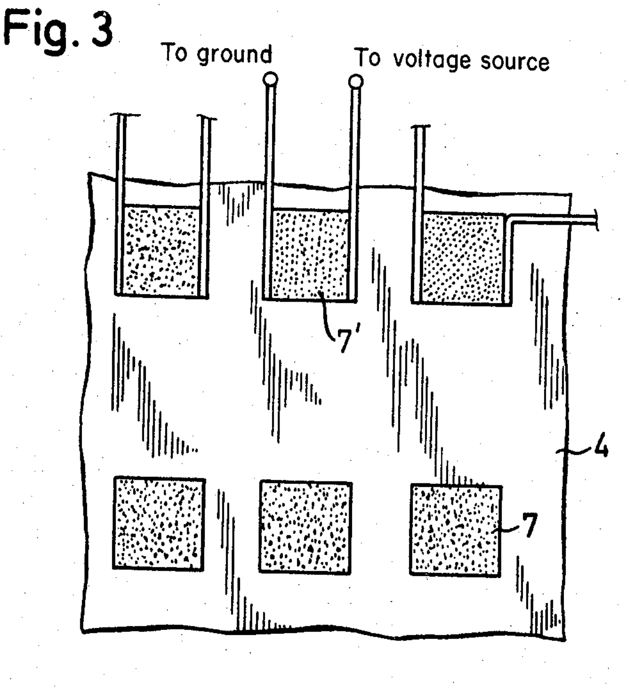
FIG. 3 is a plan view of a partially conductive rigid base.

Referring to FIG. 2, a recording material comprises a photoconductive, thermoplastic layer 1 disposed on a flexible foil carrier 2. The recording material is disposed on a conducting covering layer, subdivided into conductivity regions 7, on a rigid base 4. Each conductivity region 7, shown in the form of a rectangle in FIG. 3, is provided with two strengthened electrical supply leads. A relief image 6 is formed above the conductivity region 7'.

To produce this relief image, only the opposite conductivity region 7' is grounded during electrostatic charging under a corona. After image-wise exposure, a potential of a few volts is applied for a few seconds to the input leads of the conductivity region 7' opposite the partial image, which has a surface resistance of about 20 Ohm/square.

The relief image produced can be viewed, at the place at which it is produced, by reflection or, preferably, by transmission, which is in particular advantageous when reconstructing holograms. To erase the relief image 6 produced, the material is warmed somewhat more strongly than when the image is produced.

The uniform and durable application of the photoconductive thermoplastic material 1 onto the rigid base 4 is of particular importance in the process of the invention. Application by means of a laminating device is advantageous, and using this a contact which is free of air bubbles may be achieved by means of elastic pressure rollers, especially if lamination is carried out in a reduced pressure chamber. For this, however, the base 4 must be taken out of a recording instrument. In the case when the base 4 which is fixed into a certain position it has proved advantageous to effect contact of the recording material with the base 4 by electrostatic contact pressure. When doing this it is very advisable to apply the electrostatic contact pressure successively at adjacent positions, for example by means of a corona which is moved slowly over the recording material.

Using the arrangement shown in FIG. 2, relief images can be repeatedly produced and erased on a rigid base, which is optionally firmly fixed in position, having a conductivity pattern thereon. When repeating these cycles it should be noted, in the case of recording materials not having a conductive intermediate layer, that at the same time the polarity of the potential at the corona should be reversed during charging.

After several cycles, faults can arise which are attributable to various factors. For example, as a result of the repeated heat exposure the thermoplastic layer hardens up, that is to say the image present and the scatter background remain in part preserved and the new relief image becomes weaker. It has been found that, in the case of recording materials with a conductive intermediate layer, these faults are less prevalent.

Figure 4:
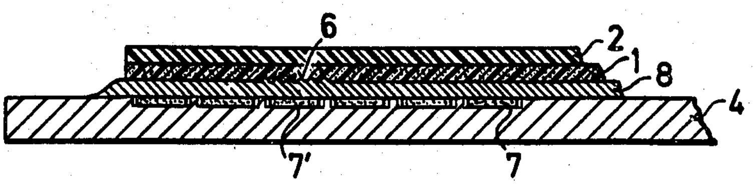
FIGS. 4 and 5 are side elevations of further, modified recording material-conductive base combinations.

Furthermore, in spite of all precautions, dust settles particularly easily on the charged layer side and enters the layer when the latter softens. After repeated heat exposure, a completely planar position is no longer guaranteed even in the case when a polyester foil carrier is used. In order to avoid these difficulties on repeated treatment it has proved particularly advantageous to modify the arrangement shown in FIG. 1 by locating the photoconducting thermoplastic layer 1 adjacent the rigid base 4. This works surprisingly well if a dielectric intermediate layer of, for example, a liquid hydrocarbon or water is present between the layer 1 and the conductive layer of the base 4. Such an arrangement is shown in FIG. 4 in which the dielectric liquid layer is designated by reference numeral 8. The thickness of the intermediate layer 8, and also the thicknesses of the other layers, are not drawn to scale. The liquid intermediate layer 8 spreads between the photoconductive thermoplastic layer 1 and the rigid base 4 by capillary action and is therefore very thin. During thermal development or erasure the temperature, with this arrangement, must not rise to near the boiling point of the liquid used. When using water as the intermediate layer it has proved advantageous to turn over the at least partially electrically conductive base 4 so that the conductive layer 5 or 7 faces outwards.

Figure 5:
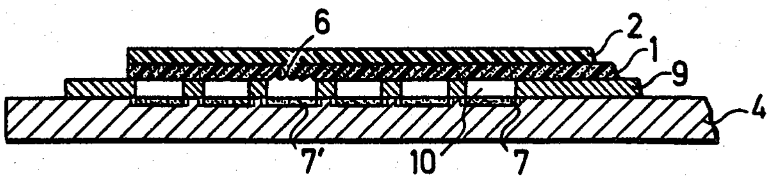

However, working with a liquid intermediate layer 8 is not always possible in practice. Furthermore, the use of such a layer 8 does not solve satisfactorily the problem of the planar position of the carrier foil 2 after several recording and erasing cycles. These two requirements may be fulfilled particularly advantageously by a process in which the recording is shaped using a firm intermediate layer between the photoconductive, thermoplastic material 1 and the rigid base 4. Such an arrangement is shown in FIG. 5. Here the dielectric intermediate layer 8 of FIG. 4 is replaced by a firm intermediate layer 9. The intermediate layer 9 may comprise a perforated metal plate which is electrically insulated from the conductivity regions of the base 4. For this purpose, an insulating layer, for example a thin plastic film (not shown in the drawing), may be provided between the metallic intermediate layer 9 and the conductivity regions of the base 4, or the base 4 may be turned over so that the conductivity regions on it face outwards. The heat treatment is then effected through the rigid base 4. It is, however, also possible to bond the firm intermediate layer 9, in the form of a perforated plate, firmly to the base 4 by forming the plate, having perforations of any desired shape, from a relatively thick layer of copying lacquer in accordance with known copying and layer-removing processes. The firm intermediate layer 9 is preferably of a dielectric material, for example a polyester foil. The photoconductive, thermoplastic material 1 and the perforated plate 9 preferably adhere by electrostatic attraction to the base 4 possessing the conductivity pattern thereon. However, the adhesion may be effected by the use of an adhesive. Preferably, the layer 1 faces inwards so that it is protected from dust. With this arrangement, the planar position of the flexible carrier 2 remains preserved even after several recording and erasing cycles. With regard to the planar position, it has proved particularly advantageous if the flexible carrier 2 can freely deform during warming and re-tension during cooling. The arrangement shown in FIG. 5 therefore represents a very advantageous embodiment for shaping partial regions of the layer 1. In the case of an inwardly arranged layer 1 the recording can be reproduced only by transmission.

If reflection is to be used for reproduction, the layer 1 must face outwards.

The dimensions of the perforations in the intermediate layer 9 are appropriately adapted to the conductivity regions of the rigid base 4. In addition, the diameters, for example, and the depths of the perforations can vary within wide limits. Equally good results are achieved, for example, with perforations of about 6 mm diameter or edge length, which are 1.5 mm deep or only 0.015 mm deep.

Equally, the diameter or edge length of about 6 mm may be reduced to about 0.1 mm. These data are examples only and do not represent the limits to be used in the process of the invention. The perforations may be as close together as the recording or erasing conditions permit without objectionable deterioration of adjacent partial images. For this, the distance between adjacent perforations generally must be between a few tenths of a millimeter and 1 mm.

Bases 4 with a conductive, preferably transparent, covering layer, which are suitable for use in the process of the invention are known. The conductive layers in general will have a surface resistance of about 20 Ohm/-square. However, deviations from this value do not interfere with the process. The conductivity patterns required in the case of shaping partial regions may be produced either directly during vapor deposition of the conductive layer onto the base 4 by using screening stencils, or may be subsequently etched into the finished conductive layer by means of the copying lacquer technique.

In the case of recording and erasing processes which take place in rapid sequence with reaction frequencies greater than about 1 $min^{-1}$, the rigid at least partially electrically conductive base 4 becomes too warm, especially in the case of thermoplastic layers with softening points below about 60° C., if additional cooling is not used. The additional cooling may be effected by, for example, a stream of air. An at least partially electrically conductive base in the form of a double plate which comprises, in addition to the base 4, a second non-conductive plate or a second plate without a conductivity pattern thereon, at a slight distance of a few millimeters from the first plate, so that a liquid for effecting temperature control, which liquid optionally circulates in the intervals between recordings, can be introduced into the interspace, has proved very suitable here. In the case of thermoplastic layers with a relatively high softening point, say above 80° C., it can be advantageous to maintain and control the temperature of the double plate at a temperature above room temperature so that the energy to be supplied for local thermal development or erasure is not too great.

It is preferred to construct the base 4 as a double plate but it is possible to effect a preheating which is constant with regard to time by means of a second layer of low ohmic resistance disposed on the rear of the simple base 4.

It is also possible substantially to increase the heat capacity of the base by application of one or more glass plates in contact with the base 4. The result of the increased heat capacity is that after a short heat impulse produced by a potential impulse, whereby the relief image is thermally developed or erased, the thermoplastic film is cooled more rapidly than, for example, merely by heat equilibration due to convection with the surrounding air. The rapid cooling of the thermally developed relief image prevents premature erasure of the relief image. Thus, the heat capacity of the carrier plate must be so chosen that the developed relief image is rapidly cooled to a temperature at which erasure takes place at most relatively slowly, so that the final temperature equilibration can then take place without impairing the image quality. A 1.4 mm thick glass base having a heating layer of resistance 20 Ohm/square heats a superposed thermoplastic photoconducting recording material to at most 120° C. over the course of 5 seconds if a potential of 30 volts is applied to the heating layer. Within 3 seconds, the temperature drops to 108° C. and the further temperature equilibration by convection with the surrounding air takes about 5 minutes. On the other hand, a base also including a 1 mm thick glass plate heats the recording material, under otherwise identical conditions, to 115° C. and subsequently cools it rapidly to 83° C. The half-lives for erasing the relief images are about 3 seconds at 108° C., but about 90 seconds at 83° C.

The photoconductive thermoplastic material must meet the general requirements for microfilm technology or holography. What is very important is a high resolution of the relief images, i.e. over a hundred lines/mm for microfilm technology and up to a thousand lines/mm for holography, for which the process of the invention is particularly suitable. The process is adapted to a special recording layer by appropriately setting the process parameters such as charge level, light exposure energy and thermal developing energy.

Examples of photoconductors which may be used are polyvinylcarbazoles, in most cases with the addition of electron acceptors such as aromatic nitro compounds or pigments such as phthalocyanines. Many polymers are suitable for use as the thermoplastic material; preferably they soften between about 60° C. and about 100° C. Known examples thereof are appropriate polystyrenes or hydrogenated colophony esters.

The recording layer and its carrier may be in sheet form or in roll form, depending on the practical requirements for replacing the recording layer of the base. In practice it may be desirable, in certain cases, to obtain the base, optionally in conjunction with an electrically conductive intermediate layer, and the recording material having a protected image-carrying surface, as a temporary laminate. In other cases, particularly easy replaceability of the recording material may be desirable, partly in order to replace consumed recording material by new material and partly to make changes in recording material stored in archives. It is advisable to provide register marks for such renewed use of the recording material.

The following Examples further illustrate the invention.

EXAMPLE 1

A clean polyester foil 100μ thick is coated on a whirler with a solution of the following composition: 200 ml of tetrahydrofuran, 1 g of poly-N-vinylcarbazole, (for example Luviken ®, BASF), 0.7 g of trinitrofluorenone, 10 g of chlorinated diphenyl (for example Clophen resin W. Bayer) and 10 g of low molecular weight poly-alpha-methyl-styrene (for example 279 V 9 of Dow Chemical Company). After 10 seconds the coated foil, which is still moist, is taken from the whirler and is stored for 20 minutes at room temperature until it is non-smudging. Thereafter it is post-dried for 15 minutes at 60° C. in a circulating air drying cabinet.

The so-obtained recording material, with the layer side outwards, is fixed, by means of adhesive tapes, tightly over a 50×50 mm glass base provided with a conductive covering layer. The surface resistance of the conductive covering layer is 18 Ohm/square.

The foil is fixed over the base by means of adhesive tapes at the lower edge in such a way that a very flat wedge of air is formed between the foil and the base. A charge is applied, starting from the apex of the wedge, by means of a needle corona at a distance of 5 mm, to which is applied a potential of −8 kV. On doing so, the foil is attracted towards, and rests flat against, the base. The material is exposed for 1.5 seconds to an He/Ne laser with divided and re-combined beams of total output 62μ W/cm$^2$ to produce a pattern of 320 lines/mm. A potential of 26 volts is applied for 5 seconds to opposite edges of the conductive covering layer. This produces a relief-like diffraction image, which acts as a diffraction grating, on the recording material. A potential of 29 volts is applied for 6 seconds to erase the relief image.

EXAMPLE 2

The procedure of Example 1 is followed, but, as the recording material support there is used a polyester foil on which aluminum has been vapor-deposited. The results are analogous to those of Example 1.

EXAMPLE 3

A recording material as described in Example 1 is fixed, with the photoconductive, thermoplastic layer side outwards, by means of adhesive tapes, tightly over a 50×50 mm glass base having a conductivity pattern of the type shown in FIG. 3 of the accompanying drawings. The conductivity pattern consists of four squares of 7 mm edge length, with strengthened input leads leading through the vapor-deposited metal layer to two opposite sides of the squares. The side edges of the squares are also strengthened. The surface resistance of the conducting layer of the squares is 18 Ohm/square. The film is fixed over the base by means of an adhesive tape at the lower edge in such a way that a very flat wedge of air is formed between the foil and the base. A charge is applied, starting from the apex of the wedge, by means of a needle corona to which a potential of −8 kV is applied and which is at a distance of 5 mm from the foil. On doing so, the foil is attracted towards, and rests flat against, the base.

The material is exposed for 1.5 seconds to an He/Ne laser with divided and re-combined beams of total output 62μ W/cm$^2$ to produce a pattern of 320 lines/mm. A potential of 4 volts is applied for 5 seconds to the input leads of the electrically conducting square located opposite the exposure region. Hereupon, a diffraction image which may serve as a diffraction grating is produced on the recording material only opposite the conducting square in question.

EXAMPLE 4

A clean polyester foil 50μ thick is coated in accordance with the procedure of Example 1. It is placed, with the layer side downwards, on the free glass side of the base described in Example 3, so that the conductivity pattern of the base faces outwards. When mounting the coated polyester foil on the base, water is dripped into the interface between the layer and the glass base so that a thin intermediate layer of water is formed at the interface.

The process steps for producing the image are carried out in accordance with the procedure of Example 3, except that a potential of 4 volts was applied for 7 seconds for thermal development which occurs via the glass plate.

In this arrangement, the diffraction image produced caused a light diffraction of low intensity. The light diffraction was noticeably more intense on the freely mounted film.

EXAMPLE 5

A clean polyester foil 50μ thick is coated on a whirler with a solution of the following composition: 1 g of copper phthalocyanine (for example Microlith Blue 4 GT of Ciba, Basel), 5 g of low molecular poly-alpha-methylstyrene (for example 279 V 9 of Dow Chemical Company) and 10 g of polystyrene of average molecular weight 30,000 (for example PS 3 of Dow Chemical Company) in 150 ml of chloroform containing 1 drop of silicone oil/liter.

After 10 seconds, the coated foil which is still moist is taken from the whirler and stored for 15 minutes at room temperature until it is non-smudging. Thereafter it is post-dried for 20 minutes at 50° C. in a circulating air drying cabinet. This foil is mounted, with the layer side inwards, by means of adhesive tapes, on a 50×50 mm glass plate having a conductivity pattern therein, on top of which pattern is a perforated, dielectric layer of the material below the dielectric layer having holes of 6 mm diameter therein. The conductivity pattern consists of four squares of 7×7 mm, with strengthened input leads passing through the metal coating (a vapor-deposited gold layer) to two opposite sides of the squares; the side edges of the squares are also strengthened. The surface resistance of the squares is 18 Ohm/square.

The holes in the dielectric layer are exactly above the conductive squares. The dielectric layer consists successively of a 1.5 mm thick plate of polymethacrylic acid methyl ester (for example Plexiglass) and of polyester foils of 0.1 mm or 0.015 mm thickness.

A selected conductive square is grounded. A charge is then applied by means of a needle corona (corona voltage −8 kV, distance from tip of needle to foil 5 mm). On doing so, the recording material and the dielectric layer are firmly pressed electrostatically onto the glass plate. The material is exposed for 0.25 second by means of an He/Ne laser with divided and re-combined beams of total output 62μ/cm$^2$ to produce a pattern of 320 lines/mm.

A potential of 4 volts is applied successively for 8 seconds/4 seconds/3 seconds to the input leads of the square. This produces a relief grating above the selected square in the region of the corresponding hole in the dielectric layer, and the incident laser light is diffracted on this grating. The other regions of the recording layer remained without images. Relief images previously produced above other conductive squares remained unchanged.

EXAMPLE 6

The procedure of Example 5 is followed, using a 0.1 mm thick dielectric layer of polyester. After recording the image, a potential of 4 volts is applied for 8 seconds to the selected conducting square. On doing so, only the relief image in question is erased. In order again to produce a relief image, the procedure of Example 5 is followed except that this time a positive potential is applied to the corona.

In this way, 10 recording and erasing cycles were carried out with equally good success, at intervals of 3 minutes. The series of tests was then stopped. The planar position of the recording foil was not impaired by the heating as can be checked from the laser light reflected at the front of the carrier foil.

EXAMPLE 7

The procedure of Example 5 is followed, but the dielectric layer is replaced by a continuous 20μ thick polyester foil with a perforated aluminum foil. The polyester foil is adjacent the conducting squares. Holes of 120μ diameter, and at a hole packing of 4,000 holes/cm$^2$, had beforehand been burned by means of electron beams into the 50μ thick aluminum foil. In this case, numerous holes are present above one conductive square. The image is produced in accordance with the procedure of Example 5, a heating potential of 4 volts being applied for 5 seconds. Round small diffraction images, which are clearly separated from one another, are produced above the conductive square in question above the individual holes of the metal foil acting as the intermediate layer.

It will be obvious to those skilled in the art that many modifications may be made within the scope of the present invention without departing from the spirit thereof, and the invention includea all such modifications.

What is claimed is:

1. A process for recording a phase hologram in the form of a relief structure of an optical image on a recording material composed of a photoconductive thermoplastic recording layer and an electrically non-conductive transparent flexible base layer comprising placing the flexible recording material which is separated by an intermediate layer on a planar, transparent, rigid base on the surface of which latter is disposed an electrically conductive layer, which is grounded, electrostatically charging the photoconductive thermoplastic layer, whereby said flexible recording material is firmly and immovably electrostatically attracted onto said rigid base, the electrostatic attraction being effected by said electrostatic charging;

holographically exposing the charged flexible recording material on the rigid base with interference patterns of light of said optical image; and softening by heat at least the surface of the charged and exposed flexible recording material on said rigid base by application of a voltage to opposite edges of the electrically conductive layer of said rigid base to thereby deform said photoconductive thermoplastic recording layer to said relief structure.

2. A process according to claim 1 wherein said base layer contacts at least one of electrically conductive surface regions in which said electrically conductive layer of the planar rigid base is subdivided, said electrically conductive surface region being grounded at the start and during the electrostatic charging of said photoconductive thermoplastic recording layer.

3. A process according to claim 1 including charging said thermoplastic photoconductive layer in locally bounded regions for recording of partical relief images and forming said partial relief images by applying voltages during the exposure on said electrically conductive surface regions on said planar rigid base, whereby said surface regions correspond to said bounded regions, the polarity of said voltages being equal or opposite to a polarity of a voltage for charging said thermoplastic photoconductive layer.

4. A process according to claim 1 wherein the recording material faces with its thermoplastic photoconductive layer the intermediate layer positioned on said rigid base during the recording of a deformation image.

5. A process according to claim 4 wherein the intermediate layer is a dielectric liquid layer spread between said photoconductive thermoplastic layer and said rigid base by capillary action.

6. A process according to claim 1 including bringing said recording material into a uniformly planar physical contact free of air bubbles with said rigid base by electrostatic attraction between the said recording material and said rigid base, said attraction being effected at the start of the electrical charging of said recording material by a corona device moved slowly over said recording material and applying an electrostatic contact pressure on said rigid base.

* * * * *

UNITED STATES PATENT AND TRADEMARK OFFICE
CERTIFICATE OF CORRECTION

PATENT NO. : 4,233,380

DATED : November 11, 1980

INVENTOR(S) : Roland Moraw and Günther Schädlich

It is certified that error appears in the above—identified patent and that said Letters Patent is hereby corrected as shown below:

Column 10, line 1 of claim 3, "claim 1" should read --- claim 2 ---.

Signed and Sealed this

*Tenth* Day of *March 1981*

[SEAL]

*Attest:*

RENE D. TEGTMEYER

*Attesting Officer* *Acting Commissioner of Patents and Trademarks*